United States Patent [19]

Melard et al.

[11] Patent Number: 4,786,325

[45] Date of Patent: Nov. 22, 1988

[54] CERIUM/RARE EARTH POLISHING COMPOSITIONS

[75] Inventors: Pierre Melard, Lagord; Francis Tastu, La Rochelle, both of France

[73] Assignee: Rhone-Poulenc Specialites Chimiques, Courbevoie, France

[21] Appl. No.: 887,389

[22] Filed: Jul. 21, 1986

Related U.S. Application Data

[63] Continuation of Ser. No. 610,049, May 14, 1984, abandoned.

[30] Foreign Application Priority Data

May 13, 1983 [FR] France .................................. 83 08003

[51] Int. Cl.$^4$ .............................................. C09G 1/02
[52] U.S. Cl. .......................................... 106/3; 51/309
[58] Field of Search .................... 106/3; 51/293, 307, 51/309; 423/263

[56] References Cited

U.S. PATENT DOCUMENTS

| | | | |
|---|---|---|---|
| 3,311,451 | 3/1967 | Silvernail | 51/293 |
| 3,768,989 | 10/1973 | Goetzinger et al. | 51/309 |
| 4,529,410 | 7/1985 | Khaladji et al. | 51/309 |

FOREIGN PATENT DOCUMENTS 2145820  3/1972  Fed. Rep. of Germany .

OTHER PUBLICATIONS

Chemical Abstracts, vol. 80, 1974, p. 248.
Chemical Abstracts, vol. 93, 1080, Jul., p. 266
57 Ceramics, vol. 82, 1975, p. 235, Pat. Publ. No. 10850/1960 published Aug. 9, 1960.
Pat. Publ. No. 9746/1964 published Jun. 5, 1964.

*Primary Examiner*—Amelia Burgess Yarbrough
*Attorney, Agent, or Firm*—Burns, Doane, Swecker & Mathis

[57] ABSTRACT

Glass polishing compositions, advantageously recycled into glassmaking formulations, are comprised of suspension of particulate ceric oxide and at least one colorless oxide of a lanthanide or yttrium rare earth, preferably an oxide of lanthanum, samarium, europium, gadolinium, dysprosium, thulium, ytterbium, lutecium, yttrium, or mixtures thereof.

86 Claims, No Drawings

CERIUM/RARE EARTH POLISHING COMPOSITIONS

This application is a continuation of application Ser. No. 610,049, filed May 14, 1984, now abandoned.

BACKGROUND OF THE INVENTION

1 Field of the Invention

The present invention relates to a novel polishing composition based on cerium, a process for its preparation and the use thereof in the polishing of glass, ceramics and other vitreous type materials. More especially, the present invention relates to a novel polishing composition based on the rare earths.

2 Description of the Prior Art

Among the polishing compositions used at the present time in the glass industry, those based on the rare earths and in particular on cerium are generally the most efficient. Different processes are known for the preparation of such compositions. Thus, it has been proposed in published German Application No. 2 426 110 to precipitate by means of sodium hydroxide, an aqueous solution of rare earth sulfates in the presence of molochite, and to filter, wash, dry and calcine the resulting product to obtain the desired polishing composition. Such a process does not enable production of a polishing composition which is completely satisfactory from an efficiency standpoint, primarily because of the heterogeneity thereof, its undefined structure and the lack of reproducibility of the final product. These disadvantages are specifically the result of the operating conditions of the process, according to which the concentration of the reagents varies during reaction and does not permit the obtention of defined products in a reproducible fashion; same also arise because of the existence of foreign compounds (molochite) and the presence of sulfates, the precipitation of which by sodium hydroxide yields mixtures of complex products, such as double sulfates, hydroxysulfates and hydroxides, the amounts and nature of which may vary throughout the course of the reaction.

It has further been proposed [*Chem. Abstracts*, 80, 51688 (1974)] to prepare cerium based polishing compounds by precipitating ceric hydroxide with ammonia from a solution of rare earth nitrate wherein the cerium had previously been oxidized. Such a process requires an additional stage of purification by recrystallization by the ceriammonium nitrate and the taking up of the calcined oxide in a dilute acid; the products obtained do not display satisfactory polishing efficiency. Furthermore, such compositions do not have satisfactory properties of homogeneity, structure and reproducibility.

A process is also known from U.S. Pat. No. 3,768,989 for the preparation of polishing compositions by forming a rare earth carbonate-wollastonite precipitate, separating the precipitate and calcining same. And from U.S. Pat. No. 3,262,766 it is also known to prepare certain polishing compositions by treatin commercial rare earth carbonate solutions with fluosilicic or hydrofluosilicic acid. The polishing compositions prepared by the processes described in the two aforenoted U.S. patents have disadvantages similar to those described in connection with the German No. 2,426,110.

To obviate the disadvantages of the aforementioned processes, in French Pat. No. 2,472,601, assigned to the assignee hereof, a novel process has been proposed for the preparation of polishing compositions, characterized in that it comprises the following stages:

(a) a solution of a cerium salt, a basic solution and a solution of at least one acid and/or salt, the anions of which are capable of forming insoluble compounds of rare earths, are mixed together simultaneously and continuously, with the number of equivalents of base being greater than or equal to the number of equivalents of cerium and the pH of the reaction medium being greater than 6;

(b) the resulting precipitate is filtered;
(c) the precipitate is dried; and
(d) the precipitate is calcined.

The process provides compositions having good homogeneity, reproducibility, suspension stability in water and good polishing efficiency. However, the aforedescribed process is not entirely satisfactory, because the anion customarily employed was fluoride and the problems usually associated with fluorides, in particular pollution by effluents, whether liquid or gaseous, are encountered.

The problem thus remains to develop a novel polishing composition which would satisfy the following requirements:

(i) to be effective, i.e., to permit the polishing of a glass surface generally clear-polished as rapidly as possible;

(ii) to be clean, i.e., not to streak the glass during the polishing process;

(iii) not to cause detrimental reactions on the surface, i.e., not to be too chemically active with respect to the glass (the problems of burning, orange peel finish, blisters, etc.);

(iv) to have an extended useful life, to be usable for the longest possible period of time without difficulty;

(v) to be stable in suspension, permitting the homogeneous distribution of the powder in the bath, without settling (the dispersion should remain effective upon placing the composition in suspension and throughout its entire working period of useful life);

(vi) absence of foam, as foaming causes overflowing, clogs the lines, reduces the yield and interferes with personnel management;

(vii) to be easy to again place into suspension after an extended work stoppage and decantation, even if the bath is charged with elements of polished glass (the phenomenon of "caking");

(viii) to be non-toxic, to avoid problems of skin afflictions and other diseases;

(ix) to be a regular product, of pleasing color and easy to use;

(x) not to adhere to the glass after polishing, thus permitting rapid cleansing; and (xi) to be readily flocculated for the elimination of manufacturing waste.

SUMMARY OF THE INVENTION

Accordingly, a major object of the present invention is the provision of an improved glass polishing composition which is conspicuously devoid of those disadvantages and drawbacks to date characterizing the state of this art, while at the same time satisfying those requirements above outlined.

Another object of this invention is the provision of an improved polishing composition that may be recycled into glass or similar materials after its utilization for polishing purposes.

As utilized herein, the term "glass" is intended to connote both glass and ceramic materials, as well as the other types of vitreous materials.

Briefly, the present invention features an improved polishing composition which is capable of being recycled into glass and is characterized in that it does not contain ions incompatible with the composition of the glass, but does contain ceric oxide and at least one colorless oxide of another rare earth selected from among the lanthanides and yttrium.

DETAILED DESCRIPTION OF THE INVENTION

More particularly according to this invention, the subject compositions are comprised of at least one oxide of a rare earth other than cerium and each such "other" oxide must not be colored, i.e., it must be a colorless compound that does not absorb light in the visible spectrum of from 0.38 to 0.70 $\mu$m.

Exemplary such rare earth oxides suitable for use in the present invention, representative are the oxides of lanthanum, samarium, europeum, gadolinium, dysprosium, thulium, ytterbium, lutecium and yttrium. These oxides typically are in the form of sesquioxides.

A mixture of oxides may also be used.

Preferably, the sesquioxide of lanthanum is used.

The proportions of ceric oxide and the oxides of rare earths in the polishing compositions of the invention advantageously vary over the following limits:

(1) 40 to 99.5% by weight of ceric oxide; and
(2) 0.5 to 60% by weight of oxides of rare earths.

Preferably, a polishing compound having the following composition is selected:

(1') 85 to 98% by weight of ceric oxide; and
(2') 2 to 15% by weight of oxides of rare earths.

The compositions according to the invention are prepared by the following process, which circumscribes another object hereof, and which comprises:

(i) mixing together simultaneously and continuously a solution of a cerium salt, a basic solution and a solution of at least one salt of a trivalent rare earth selected from among the lanthanides and yttrium, the oxide of which is colorless; the number of equivalents of base employed being greater than or equal to the number of cerium and rare earth equivalents and the pH of the reaction medium being greater than 6;

(ii) filtering the precipitate which results;
(iii) drying said precipitate; and
(iv) calcining said dried precipitate.

In the first stage of the process, the intimate admixture of the different reagents is carried out.

The solution of the cerium salt employed according to the process of the invention may be any aqueous solution of a salt of cerium in the cerous and/or ceric state that is soluble under the conditions of the invention, in particular a solution of cerous chloride or cerium nitrate in either the cerous or ceric state, or a mixture of the two.

The cerium salt is selected such that it does not contain impurities which may be contained in the final composition, after calcination. It may be advantageous to use a cerium salt having a purity higher than 99%.

The concentration of the cerium salt solution is not a critical factor according to the invention and it may vary over wide limits; a concentration between 0.2 and 4 moles per liter, however, is preferred.

In a preferred embodiment of the process according to the invention, the cerium is introduced into the reaction medium in the cerous state and is then oxidized to the ceric state by continuously adding to the reaction mixture, individually or in admixture with a solution other than that containing the base, an oxidizing agent compatible with said medium. Among such oxidizing agents that are suitable, the following are especially representative: solutions of sodium, potassium, or ammonium perchlorate, chlorate, hypochlorate, persulfate, hydrogen peroxide or air, oxygen or ozone. The cerium may also be oxidized electrochemically. Hydrogen peroxide is preferably used.

The proportion of the oxidizing agent with respect to the cerous salt to be oxidized may also vary over wide limits. It is generally greater than the stoichiometric amount, and preferably is present in a 10 to 40% stoichiometric excess.

According to the process of the invention, an aqueous solution of a salt of at least one trivalent rare earth is added individually or in admixture with the solution of the cerium salt, to the reaction mixture, said trivalent rare earth being selected from among the lanthanides and yttrium and having the characteristic of forming a colorless oxide. The salt must be soluble under the conditions of the invention. Among the salts that are well suited, specifically exemplary are the lanthanum, samarium, europeum, gadolinium, dysprosium, thulium, ytterbium, lutecium and yttrium chlorides or nitrates.

The concentration of the salt or salts of the rare earth or earths used in the process of the invention is not a critical factor and it may also vary over wide limits; preferably, however, such concentration ranges from 0.2 to 4 moles per liter.

The proportion or ratio between the cerium salts and the solutions of the salt or salts of the rare earth or earths is determined by controlling their respective flow rates such that the desired composition is obtained having the weight percentage of each component in the ranges described above.

The basic solution employed in the process of the invention is advantageously an aqueous solution of ammonium or sodium or potassium hydroxide, or sodium carbonate. According to the invention an ammonia solution is preferred. The normality of the basic solution used is not a critical factor, but advantageously it ranges from 1 to 5N.

The proportion or ratio between the basic solution and the solution of the cerium salt and the salt or salts of the rare earth or earths should be such that the number of equivalents of base is greater than or equal to the number of equivalents of cerium or rare earth or earths introduced simultaneously. It may be advantageous to use a greater than 5% excess of the equivalents of base with respect to the equivalents of cerium and rare earth or earths. The pH of the reaction medium must be higher than 6 but should not exceed approximately 10. Advantageously, it ranges from 7 to 9. It may be especially advantageous to adjust the pH within these limits to a constant value of ±0.1 pH units.

The mixture of the different solutions of the aforementioned reagents may be effected in any one of a number of ways. For example, the mixture may be prepared under agitation by adding, continuously and separately the solution of the cerium salt, then the solution of the oxidizing agent, the solution of the salt or salts or the rare earth or earths and the basic solution. A premixture of the solution of the cerium salt and the solution of the rare earth or earths salts or salts may also be prepared; it is then added continuously to the reaction medium simultaneously with the basic solution. In the case of the use of an oxidizing agent, it is possible to add it in a mixture with the solution of the cerium salt solution and/or the solution of the salt or salts of the rare earth or earths.

Regardless of the order of the introduction of the reagents selected, the mixture takes place instantaneously: a well defined concentration of the different species present is obtained at each instant throughout the reaction mass. This makes it possible to obtain defined, homogeneous compositions with stable characteristics.

The temperature of the reaction medium is not critical and preferably ranges from 10° to 95° C.; more preferably it ranges from 20° to 70° C.

The holding time of the mixture in the reaction medium is not a critical factor according to the invention and may also vary over wide limits; generally, a holding time of from 30 minutes to 2 hours suffices.

In another embodiment of the process according to the invention, the reaction mass may be aged for a certain period of time at a temperature ranging from 10° to 95° C. and preferably from 20° to 80° C., prior to filtering. In this case, the aging temperature is not a critical factor according to the invention and too may vary over wide limits; however, a period of time of from 30 minutes to 2 hours is generally satisfactory. The aging operation is carried out under agitation.

The second stage of the process of the invention comprises filtering the reaction mass after the reaction, which is present as a suspension. This filtering operation may be carried out continuously at ambient temperature, i.e., at a temperature of from 10° to 25° C.

In still another embodiment of the invention, the filter cake may then be washed with water. After washing, the cake contains 20 to 80% by weight water and typically from 30 to 50%.

The product obtained after filtration and the optional washing is then dried continoously. The drying temperature preferably ranges from 100° to 600° C., with the time varying under these conditions preferably from 30 minutes to 2 hours.

The dry product is subsequently calcined, optionally, in a continuous manner, at a temperature of from 600° to 1200° C., preferably from 950° to 1150° C., for a period of time advantageously ranging from 30 minutes to 10 hours.

The calcined product is then ground such as to provide aggregate dimensions of 0.2 to 5.0 μm. Generally, the size of the aggregates, expressed by their mean diameter, ranges from 0.5 to 1.5 μm. The mean diameter is defined as a diameter such that 50% by weight of the aggregates have a diameter greater or lesser than the mean diameter.

The grinding is optionally accompanied by a grain size selection operation, which may be carried out simultaneously or successively.

An additional embodiment of the invention comprises preparing the first stage admixture in two ways (1) and (2), which are virtually identical with the exception of the reaction temperature: method (1) provides a precipitate under hot conditions, while in method (2) the precipitate is obtained cold. The mixture of the precipitate obtained by the methods (1) and (2) is then carried out either before or after filtering.

More precisely, this embodiment of the invention comprises:

(I) according to method (1), of mixing simultaneously and continuously, at a temperature ranging from 40° to 95° C., a solution of the cerium salt, the basic solution and a solution of at least one salt of a trivalent rare earth selected from among the lanthanides and yttrium, the oxide of which is colorless; the number of equivalents of base employed is greater than the number of equivalents of cerium and rare earth of earths and the pH of the reaction medium is greater than 6; or, according to method (2), of mixing simultaneously and continuously, at a temperature ranging from 10° to 25° C., a solution of the cerium salt, the basic solution and a solution of at least one salt of a trivalent rare earth selected from among the lanthanides and yttrium, the oxide of which is colorless; the number of equivalents of base is greater than the number of equivalents of cerium and the rare earth or earths and the pH of the reaction medium is greater than 6;

(II) effecting the mixture of precipitates obtained by method (1) and method (2) either prior to or after filtration;

(III) drying the mixture obtained; and (IV) calcination of the dried mixture.

As mentioned above, the reagents used in methods (1) and (2) have the same properties and are used in the same proportions as those obtained by the embodiment of the invention described initially.

The parameters of the process are otherwise identical with the exception of the reaction temperature.

The temperature of the reaction medium according to method (1) ranges from 40° to 95° C., and preferably from 40° to 60° C.

According to method (2), the temperature ranges from about 10° to 25° C., and preferably is about 20° C.

The holding time of the mixture prepared according to method (1) and method (2) in the reaction medium is not a critical factor according to the invention and may vary over wide limits; generally, holding times ranging from 30 minutes to 2 hours are selected.

The precipitates obtained by the method (1) and the method (2) may be admixed, either in the form of an aqueous solution, prior to or after aging, or in powder form, after filtration.

In yet another embodiment of the process of the invention, the aging of the reaction mass obtained by method (1) and method (2) may be carried out separately or together, as the aging conditions may be identical or different.

The reaction mass obtained according to the method (1) and method (2) (or which results from their mixture) may be aged prior to the filtering operation over a certain period of time at an identical or different temperature, ranging from 10° to 95° C. and preferably from 20° to 70° C. In this case the aging time is not a critical factor according to the invention and may also vary over wide limits; however, a period of time of from 30 minutes to 2 hours is generally satisfactory. The aging operation takes place without agitation.

In accordance with this embodiment of the invention, the mixture of the two aqueous solutions respectively contains, in suspension, the precipitate obtained by the method (1) and the precipitate obtained by method (2); said mixture is effected either prior to or after aging.

The mixture obtained is then filtered. The filtering operation is carried out optionally continuously at ambient temperature, i.e., at a temperature generally ranging from 10° to 25° C.

The filter cake may be washed with water. After washing, the water content of the cake ranges from 20 to 80% by weight and typically from 30 to 50%.

In yet another embodiment of the invention, the reaction masses obtained by methods (1) and (2) may be filtered separately after optional aging.

Filtration, which may be followed by washing, is carried out under the aforedescribed conditions.

The precipitates obtained individually are then mixed together.

Regardless of the method elected for preparation of the mixture, its composition is not critical and in general the proportion of the precipitate obtained by the method (2) provides the final composition with 10 to 75% by weight preferably 25 to 75% by weight, of the total amount of the rare earths, expressed as the oxides of the rare earths, including the ceric oxide.

The product obtained according to method (1) and method (2) after filtration and optional washing is subsequently dried, optionally in a continuous manner. The drying temperature prefereably ranges from 100° to 600° C., with the drying time varying under these conditions preferably from 20 minutes to 2 hours.

The dry product is then calcined, optionally continuously, at a temperature which ranges from 600° to 1200° C., preferably from 950° to 1150° C., for a period of time advantageously ranging from 30 minutes to 10 hours.

The calcined product is then ground under the conditions described above.

The process of the invention is conveniently carried out in conventional apparatus.

The stage of mixture of the reagents occurs in a reactor fitted with a temperature controlled heating device, conventional means for reaction control (thermometer), agitating means (anchor or screw agitation), means to introduce the reagents and a pH regulation unit situated at the outlet of the reactor.

The aging operation is carried out in the same type of apparatus with the exception that it is not equipped with means to introduce the reagents or with the pH control unit. The reaction mass flows from one reactor to the other by gravity.

Subsequently, the filtration of the suspension obtained takes place in a continuous filtering apparatus, for example a Vernay type rotating filter or a band filter.

The filter cake is introduced via any appropriate mechanical means (scraper) into the dryer-calciner apparatus.

The drying and calcining operations may be carried out in two distinct devices or follow each other in a single apparatus of the rotating furnace type. Preferably, a slightly inclined rotating furnace is used, thereby permitting the circulation of the material and insuring in the first portion thereof the drying of the product and, in the second part, its calcination, by virtue of a higher temperature gradient due to the proximity of the flame, preferably supplied by natural gas.

After calcination, the composition obtained may be subjected to various finishing operations, which consist of grinding and a grain size selection, which may be carried out in the same apparatus, for example, a micronizer assembly.

Carrying out the embodiment of the invention which comprises mixing the precipitates obtained by the two different methods (1) and (2) may entail an adaptation of the equipment used only in the stages preceding the calcining operation.

The stage of the mixture of the reagents according to method (1) is carried out in a reactor equipped with a temperature controlled heating device, conventional reaction control means (thermometer), agitating means (anchor or screw agitation), means to introduce the reagents and a pH control unit situated at the outlet of the reactor.

The aging operation is effected in the same type of apparatus, with the exception that it is not equipped with means for the introduction of the reagents and the pH control unit. The transfer of the reaction mass from one reactor to the other again takes place by gravity.

The mixture provided by method (2) is carried out in a similar reactor, with the only difference being that it is not always necessary to equip it with a heating device.

Aging following the method (2) is performed in a reactor identical with that used for method (1).

According to one embodiment of the invention, the mixture of aqueous suspensions of the precipitates obtained according to methods (1) and (2) may be carried out in an aging reactor common to methods (1) and (2), or in a filtering vessel.

The filtering of the mixture of the aqueous suspensions obtained according to methods (1) and (2), or the precipitates separately obtained by the methods (1) and (2) is conducted, optionally in a continuous manner, in conventional filtering apparatus, for example, a Vernay type rotating filter or a band filter.

The filter cake is introduced by means of any appropriate mechanical means (scraper) into the dryer-calciner apparatus.

According to another embodiment of the invention, the mixture of precipitates obtained by methods (1) and (2) is performed after filtration, in the drying and/or calcining apparatus, identical to that described above.

After calcination, the resultant composition may be subjected to finishing operations carried out in the aforementioned apparatus.

The use of the compositions according to the invention for the polishing of glass is done in conventional manner. As they are generally used in a sprinkler system, they are placed in suspension in water.

The formulation of polishing baths is done simply by addition of the powdered composition to a manually agitated aqueous medium or a medium agitated by conventional agitator means (anchor, screw or turbine, etc., agitators).

The amount of the composition introduced is such that typically the concentration of the composition, expressed in $CeO_2$, varies from 30 to 200 g per liter of the bath.

The amount of water employed in the preparation of the polishing bath is not critical, but it is preferably to use a soft water, i.e., water with a hardness of less than 30° TH, in order to maintain a good suspension of the composition in water.

The temperature of the bath is selected such that it is less than 50° C. It is advantageous to operate at low ' temperatures, on the order of 20° C., as any rise in temperature accelerates the settling of the suspension.

The polishing compositions of the invention have numerous advantages:

(i) they have an improved appearance: fineness, grain size, color;

(ii) they have good homogeneity and reproducibility;

(iii) they have a specific surface which typically ranges from 2 to 10m$^2$/g and preferably from 3 to 8 m$^2$/g. Specific surface is defined as the B.E.T. surface determined by the method of Brunauer, Emmett and Teller, described in Journal of American Chemical Society, 60, 309 (1938).

(iv) they also have improved density and suspension stability properties: and (v) they provide improved performance, e.g., polishing efficiency, speed of polishing, low rate of rejection of polished finished pieces, and the like.

The compositions provided by the process of the invention may be used for the polishing of glass or like materials.

The subject compositions are especially adopted for the mass production of spectacle lenses and also in other prescription glassmaking applications.

A particularly important field of application for the subject compositions is the glass industry, including the making of crystal glassware, mirror making, flat glass (especially glazing and double glazing), rearview mirrors for automotive vehicles and television screens.

The use of the compositions of the invention is especially advantageous in view of the fact that they may be recycled into glass when they are worn out and have suffered a loss in polishing efficiency. Generally, they are charged to the extent of 10 to 15% by weight of the dry solids of the exogenic elements (glass removed).

The spent polishing composition in suspension in the polishing bath may be recovered by any liquid/solid separation method, for example, by centrifuging or flocculating filtration. In the latter case, conventional flocculating agents, preferably inorganic may be used: ferric sulfate, aluminum hydroxychloride, etc.

This capability of being recycled may represent a significant savings in material, the more so since the consumption of ceric oxide in the glass industry will not cease to increase, for the following reasons:

The chemical decoloration of glass consists of adding to the glass an oxidizing agent which causes iron to convert from the FeO state to the $Fe_2O_3$ state, which is much less a colorant. Oxidation is carried out by conventional decolorization agents, such as $As_2O_5$, $Sb_2O_5$. The present trend is to replace them with ceric oxide as the latter has the great advantage of being non-toxic.

Furthermore, the amounts of ceric oxide employed are much greater in the manufacture of television screens. It is known that ceric oxide plays a protective role against X-rays and alpha-rays, such that it is used at the present time in amounts of 0.5 to 3% of the weight of the glass. Consequently, the advantage realized by the recycling for television screens of the compositions according to the invention is quite appreciable.

The compositions of the invention contain no ions capable of interfering with the composition of the glass and may thus advantageously serve as a source of ceric oxide.

In order to further illustrate the present invention and the advantages thereof, the following specific examples are given, it being understood that same are intended only as illustrative and in no wise limitative.

The polishing compositions featured in Examples 1 and 2 based on ceric oxide and lanthanum oxide are prepared by the general mode of preparation of the invention, while the procedure described in Example 3 illustrates the embodiment of the invention wherein, in the first stage thereof, the mixture of reagents according to the methods (1) and (2) is carried out.

The different compositions prepared are then subjected to testing to determine their physico-chemical properties and their polishing efficiency.

EXAMPLE 1

Preparation of a polishing composition (A) according to the Invention, having the following composition by weight:

(1) Ceric oxide 92; and (2) Lanthanum sesquioxide 8%

This composition contained no fluoride anions and the amount of colorant rare earths was very low (less than 1% expressed by weight of the rare earths oxides).

This composition prepared as follows:

(a) Into two premixing vessels of 250 cm$^3$ capacity, and equipment with an agitator system, the following materials were respectively introduced:

Into the first:

(i) an aqueous 3N ammonia solution; and

Into the other:

(i) an aqueous solution containing 1 mole per liter of rare earths oxides (cerous nitrate and lanthanum nitrate in amounts such that 92% ceric oxide and 8% lanthanum oxide were provided); and (ii) 200 volumes of an aqueous solution of hydrogen peroxide (the proportion of hydrogen peroxide with respect to the cerous salt was in a 35% excess).

Into a 2-liter temperature controlled reactor, equipped with an agitator system and a pH control unit situated at the outlet thereof, the aforesaid two solutions were introduced simultaneously and continuously at a flow rate such that the pH control unit was regulated at pH=7.8.

The reactor was operated at 50° C.; the holding time was 1 hour.

The reaction mass was transferred by gravity into a similar reactor in which the aging was carried out, at a temperature of 75° C. over a holding time of 1 hour.

(b) The precipitate obtained was filtered at 22° C. in a Vernay type rotating filter.

(c) The precipitaee was subsequently dried and calcined in a rotating furnace, the temperature of which ranged from 100° C. at the inlet to 1090° C. at the outlet and which represents approximately 2 hours of drying at a temperature ranging from 100° to 600° C. and 3 hours of calcination at a temperature ranging from 600° C. to 1090° C.

(d) A product (A) was obtained, which was finished by introduction into a micronizer which simultaneously effected grinding and grain size selection by means of a stream of air.

EXAMPLE 2

Preparation of a polishing composition (B) according to the invention, having the following composition by weight:

(1) Ceric oxide 92%; and (2) Lanthanum sesquioxide 8%

This composition contained no fluoride anions and the amount of colorant rare earths was very low (less than 1% expressed by weight of the rare earth oxides).

This composition was prepared by employing the solutions described in Example 1 in the following process:

(a) Into a reactor such as that described above, simultaneously and continuously the two solutions were introduced at a rate such that the pH control unit was adjusted to pH=7.6.

The reactor was operated at 20° C.; the holding time was 1 hour.

The reaction mass was transferred by gravity into a similar reactor in which the aging was carried out at a temperature of 20° C. for 1 hour.

(b) The precipitate obtained was filtered at 22° C. in a Vernay type rotating filter.

(c) Drying and calcining was subsequently carried out in a rotating furnace, the temperature of which ranged from 100° C. at the inlet to 1100° C. at the outlet, which represents approximately 2 hours of drying at a temperature ranging from 100° to 600° C. and 3 hours of calcination at a temperature ranging from 600° to 1100° C.

(d) A product (B) was obtained, which was finished by introduction into a micronizer which effected grinding and grain size selection by means of a stream of air.

EXAMPLE 3

Preparation of a polishing compound (C) of the invention, having the following composition by weight:
(1) Ceric oxide 92%; and
(2) Lanthanum sesquioxide 8%.

This composition contained no fluoride anions and the amount of colorant rare earths was very low (less than 1% expressed by weight of the oxides of rare earths).

Same was prepared in the following manner:

(a) In accordance with the aforedescribed method (1), a precipitate was prepared hot, which was then aged and filtered.

Consistent therewith, into two 250 cm$^3$ premixing vessels equipped with agitation means, the following materials were respectively introduced:
Into the first:
(i) a 3N aqueous solution of ammonia; and
Into the other:
(i) an aqueous solution containing 1 mole per liter of rare earth oxides, i.e., cerous nitrate and lanthanum nitrate in amounts such that 92% ceric oxide and 8% lanthanum oxide were obtained; and
(ii) a 200 volume aqueous solution of hydrogen peroxide (the amount of the hydrogen peroxide being in excess by 35% with respect to the cerous salt).

Into a 2-liter temperature controlled reactor, equipped with an agitator system and pH control unit situated at the outlet thereof, the two solutions were introduced simultaneously and continuously at a flow rate such that the pH control unit was regulated at pH=7.8.

The reactor was operated at 50° C.; the holding time was 1 hour.

The reaction mass was transferred by gravity into a similar reactor in which the aging was carried out at a temperature of 75° C. for 1 hour.

Subsequently, the precipitate obtained by method (1) at 22° C. was filtered in a Vernay type rotating filter.

(b) A precipitate was prepared cold by method (2) and was subsequently aged and filtered.

In an identical manner, the following materials were respectively introduced into two 250 cm$^3$ premixing vessels equipped with an agitator system:
Into the first:
(i) a 3N aqueous solution of ammonia, and
Into the other:
(i) an aqueous solution containing 1 mole per liter of rare earth oxides, i.e., cerous nitrate and lanthanum nitrate in amounts such that 92% ceric oxide and 8% lanthanum oxide were obtained; and
(ii) a 200 volume aqueous solution of hydrogen peroxide (the amount of which constituted a 35% excess with respect to the cerous oxide).

Into a 2-liter reactor equipped with an agitator system and a pH control unit situated at the outlet thereof, the two solutions were introduced simultaneously and continuously at a flow rate such that the pH control unit was regulated at pH=7.6.

The temperature in the reactor was 20°-22° C. and the holding time was 1 hour.

The reaction mass was transferred by gravity into a similar reactor in which the aging was carried out at a temperature of 70° C. for 1 hour.

The precipitate obtained by method (2) was then filtered on a Vernay type rotating filter.

(c) The precipitates obtained by methods (1) and (2) were mixed together at the inlet of the drying and calcining apparatus. The proportion of the precipitate obtained by method (2) was such that said precipitate provided the final composition with 25% by weight of the total amount of rare earths expressed as the oxides thereof, including ceric oxide.

(d) Subsequently, the mixture of precipitates was dried and calcined in a rotating furnace, the temperature of which ranged from 100° C. at the inlet to 1090° C. at the outlet, which represents approximately 2 hours of drying at a temperature ranging from 100° to 600° C. and 3 hours of calcination at a temperature ranging from 600° to 1090° C.

(e) A product (C) was obtained, which was finished by introduction into a micronizer which simultaneously effected grinding and grain size selection by means of a stream of air.

The polishing compositions (A), (B), (C) respectively obtained according to the aforesaid Examples 1, 2 and 3 were subjected to different physico-chemical tests to ascertain their properties:

(1) Apparent packed density:

Same was determined in accordance with the standard DIN 53-194. The principle of the method is to introduce a known amount of the product in powder form into a graduated test tube and to subject it to packing under predetermined conditions.

The results obtained were as follows:

|  | $d_4$ |
| --- | --- |
| Composition (A) | 1.6 ± 0.2 |
| Composition (B) | 1.7 ± 0.2 |
| Composition (C) | 1.7 ± 0.2 |

(2) True density:

This was measured by means of a gas pycnometer, Micromeritics Model 1302, which reports the absolute volume of a known mass of the composition to be tested.

The true density of the three compositions was $\rho = 7.2 \pm 0.1$ g/cm$^3$.

(3) Grain size distribution:

To determine the grain size distribution of each composition, 40 cm$^3$ of a suspension to be analyzed was prepared in a proportion of 12 g per liter of distilled water containing 1 g/l sodium hexametaphosphate.

The agglomerates were then disintegrated by ultrasonic waves generated by an ultrasonic apparatus Annemasse (80 W, frequencey 26 KHz). The operation required 5 minutes.

Grain size analysis was then performed by means of a Sedigraph 5000 D.

The instrument measured the rate of sedimentation of particles in suspension and automatically provided the results in a cumulative percentage distribution as a function of equivalent spherical diameters (based on Stokes' law).

The instrument determines by transfer through a very fine beam of X-rays the concentration of particles retained in suspension at different levels of sedimentation as a function of time. The logarithm of the intensity of the X-rays is generated electronically and recorded, then plotted linearly as "cumulative percentages" (as smaller than) on the Y-axis of an XY recorder. To limit the time required for the analysis, the sedimentation cell is continuously in motion, such that the depth of the sedimentation cell is inversely proportional to time. The movement of the cell is synchronized with the X-axis of the recorder to indicate directly the equivalent spherical diameter corresponding to the time elapsed at a given depth of sedimentation; the dimension information is displayed on a 3 module log sheet.

The table below reports the mean diameters obtained for each composition:

|                  | $d_{50}$ in $\mu m$ |
| ---------------- | ------------------- |
| Composition (A)  | $0.5 \pm 0.25$      |
| Composition (B)  | $0.8 \pm 0.25$      |
| Composition (C)  | $0.7 \pm 0.25$      |

The standard deviations $e_1$ and $e_2$, which respectively are the ratios $d_{84}/d_{50}$ and $d_{50}/d_{16}$ are:

|                  | $e_1$ | $e_2$ |
| ---------------- | ----- | ----- |
| Composition (A)  | 4     | 3     |
| Composition (B)  | 3.5   | 3     |
| Composition (C)  | 4     | 3     |

(4) Specific surface:

The polishing compositions had a specific surface determined by B.E.T. method, equal to:

|                  | Specific Surface in $m^2/g$ |
| ---------------- | --------------------------- |
| Composition (A)  | $6.0 \pm 0.5$               |
| Composition (B)  | $5.0 \pm 0.5$               |
| Composition (C)  | $5.5 \pm 0.5$               |

(5) Stability of suspension:

Into a 250 cm³ test tube, the suspension of the composition to be tested was introduced in a proportion of 50 g/l or 12.5 g of the powder in 250 cm³ water with a hardness of 28°TH and temperature of 20° C. After complete homogenization of the suspension, the rate of settling was observed by means of a densitometer (graduation of 1000 to 1100) as a function of time. The curve d=f(t) could be plotted.

The $T_{50}$ is the numerical expression of the behavior of the product with respect to its ability to remain in suspension. This is the time, expressed in decimal minutes, after which the measured value is the mean between the initial density and the final density of the clear liquid.

The $T_{50}$ of the compositions (A), (B), (C) was equal to 3 min±0.5.

(6) Initial densification:

This concept follows chronologically from the maintenance in suspension. In effect, whether the product is assisted or not, it always settles. Users often prepare their suspensions in advance having the desired concentration, and store it in anticipation of later use on the polishing machines. A lapse of time, possibly amounting to several days, occurs between the preparation of the suspension and its use, during which settling takes place. There are then two possible cases:

(1) either the sediment forms an expanded, impalpable layer; or (2) the portion resting on the bottom of the vessel is of a muddy, adhesive appearance, or even resembles concrete.

In the first case, the resuspension of the product is instantaneous and complete and the intended concentration is recovered. If, on the other hand, the product is compacted as in the second case, only part of the product is replaced in suspension, resulting in a depletion of the bath in the polishing composition. In extreme cases compacting reaches proportions such that it is impossible to free the product from the base of the vessel. The result is an appreciable loss of the new product which has become unusable.

To determine the tendency to compact or not, the following test was performed which consisted of preparing in a 5liter vessel a thoroughly homogenized suspension, by dispersing 100 g of the composition to be tested per liter of tap water. After 24 hours, condition of the settled portion was "evaluated manually". Two more determinations were made in 48 to 72 hours. In view of the impossibility of numerically characterizing a tactile sensation, the magnitude of compaction was evaluated on the following scale: no compaction, light compaction, compaction.

Very light compaction was observed with the three compositions (A), (B), (C).

(7) Caking index:

Even though their effects are similar both relative to their course and the difficulties they cause, it is necessary to distinguish compacting from caking. Compacting refers to the fresh product. Caking, on the other hand, appears in the machines during or after use of the product.

In the case of polishing under severe conditions (high velocity, strong pressures), the polishing composition suffers appreciable mechanical wear, e.g., breakage of the agglomerates, displacement of the grain size distribution toward fines. On the other hand, the suspension is enriched in foreign particles (silicates from the glass removed). The combination of these two factors results in the fact that when, at the end of the day or the week, as is often the case, the machines are stopped, and the product settles in the containers and the piping in the form of a coherent and adhesive mud. This is the phenomenon of caking. Resuspension upon restarting the machines is difficult or in the worst of cases is impossible.

To determine the caking index, the suspension is introduced into a stainless steel beaker after it has served as a ' polishing agent (see the following test). After being permitted to stand for 24 hours to induce settling, the product is resuspended by controlled mechanical agitation (250 rpm, 5 min). The supernatant is discarded and the beaker placed in an oven to dry the fraction that has not been resuspended. The caking index (IC) is the percentage representing this fraction with respect to the quantity of the composition initially charged. The following caking indices IC were obtained:

|  | IC in % |
| --- | --- |
| Composition (A) | 25 |
| Composition (B) | 30 |
| Composition (C) | 25 |

(8) Polishing efficiency:

The test was conducted using different types of polishing materials:

polyurethane foam, felt and Pellon (composite lapping cloth).

(a) Efficiency on polyurethane foam:

A CMV Model 7 industrial machine equipped with two brushes and a convex polishing head was used. A pump supplied the suspension of the composition to be tested to the surface of the glass to be polished.

The operating conditions were the following:
(i) Speed of head: 1500 rpm
(ii) Speed of brushes: 1000 rpm
(iii) Pressure: 1200 g/cm$^2$
(iv) Concentration of suspension: 50 g/l
(v) Water hardness: 28° TH
(vi) Temperature 20° C.
(vii) Polisher: of polyurethane foam MPU LP 46 (thickness 1.3 mm)
(viii) Glass to be polished: Crown white diameter: 55 mm
(ix) Flow rate of pump: 3.8 to 4 l/min
(x) Duration of experiment: 3 min
(xi) Overall test period: 60 min The concave faces of the two glass specimens were worked together for 3 min, after which the removal of material was determined by weighing. The experiment was repeated for one hour.

The mean weight removed was related to:
(1) Unit weight: in mg
(2) Unit surface: in dm$^2$
(3) Unit time: in min The curve of polishing efficiency was plotted as a function of working time.

From this curve, polishing efficiency is expressed as the average of the first 10 results.

The results obtained were as follows:

|  | Polishing efficiency on MPU, in mg/dm$^2$/min |
| --- | --- |
| Composition (A) | 340 |
| Composition (B) | 340 |
| Composition (C) | 340 |

(b) Efficiency on felt:

Tests were conducted on a Coburn 603 machine with a single brush, the felt polisher of which was sprinkled uniformly with the composition to be tested.

The operating conditions were as follows:
(i) Speed of polisher: 550 rpm
(ii) Speed of brush: same, as brush was propelled by polisher
(iii) Pressure: 250 g/cm$^2$
(iv) Concentration of suspension: 50 g/l
(v) Water hardness: 28° TH
(vi) Temperature: 20° C.
(vii) Polisher: felt (Blu-Streak type)
(viii) Glass to be polished: Crown white
(ix) Flow rate of pump: 1.2 to 1.4 l/min
(x) Duration of experiment: 15 min
(xi) Overall test period: 1 hour, 30 min The expression of polishing efficiency was identical to that preceding for the CMV machine.
(x) Duration of experiment: 15 min
(xi) Overall test period: 3 hours Polishing efficiency was determined by averaging the efficiencies obtained after 30, 45, and 60 min.

The polishing efficiencies obtained were as follows:

|  | Polishing efficiency on Pellon, in mg/dm$^2$/min |
| --- | --- |
| Composition (A) | 50 |
| Composition (B) | 54 |
| Composition (C) | 50 |

In order to compare the properties of the subject polishing compositions and to evaluate their performance, the profile of a conventional polishing composition marketed commercially under the trademark Cerox 1650 was presented; it had the following composition:
(1) Rare earth oxides: 94%
  (i) Ceric oxide: 66%
  (ii) Lanthanum oxide: 19%
  (iii) Neodymium oxide: 9%
  (iv) Praseodymium oxide: less than 0.0001%
(2) Fluoride, expressed in F$^-$: 4%
(3) Phosphate, expressed in P$_2$O$_5$: 4%
(4) Apparent packed density: $d_a = 0.6 \pm 0.2$ Polishing efficiency was determined at the efficiency plateau, i.e., the average of the tests from 45 min to 1 hour, 30

The following polishing efficiencies were obtained:

|  | Polishing efficiency on felt, in mg/dm$^2$/min |
| --- | --- |
| Composition (A) | 40 |
| Composition (B) | 44 |
| Composition (C) | 40 |

(c) Efficiency on Pellon:

The test was conducted on the aforementioned Coburn machine. The polisher used was a self-adhesive Pellon made by the Hartfelt Co. and bonded to a flat tool.

The operating conditions were as follows:
(i) Speed of polisher: 550 rpm
(ii) Speed of brush: same, as brush was propelled by polisher
(iii) Pressure: 250 g/cm$^2$
(iv) Concentration of suspension: 50 g/l
(v) Water hardness: 28° TH
(vi) Temperature: 20° C.
(vii) Polisher: Pellon
(viii) Glass to be polished: Crown white
(ix) Flow rate of pump: 1.2 to 1.4 l/min
(5) True density: $\rho = 6.55 \pm 0.1$ g/cm$^3$
(6) Grain size distribution: $d_{50} = 1.5$ μm $\pm 1$
(7) Suspension stability: $T_{50} = 3$ min
(8) Initial compaction: no compaction
(9) Caking index: IC=40%
(10) Polishing efficiency:
  (i) Efficiency on polyurethane foam=370 mg/dm$^2$/min
  (ii) Efficiency on felt=38 mg/dm$^2$/min
  (iii) Efficiency on Pellon=44 mg/dm$^2$/min

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a polishing composition of matter, consisting essentially of (i) simultaneously and continuously intimately admixing a solution of a cerium salt that comprises an aqueous solution of at least one of cerous chloride, cerous nitrate, and ceric nitrate, a basic solution selected from the group consisting of ammonia, sodium or potassium hydroxide and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (ii) filtering the precipitate which results, (iii) drying said precipitate, and (iv) thence calcining said precipitate.

2. The process as defined by claim 1, wherein the concentration of the solution of the cerium salt ranges from 0.2 to 4 moles per liter.

3. The process as defined by claim 2, wherein the cerium is introduced into the reaction medium in the cerous state and is thereafter oxidized to the ceric state by continuously adding an oxidizing agent to said reaction medium.

4. The process as defined by claim 3, said oxidation being carried out by means of an oxidizing agent comprising a solution of sodium, potassium or ammonium perchlorate, chlorate, hypochlorate, persulfate, hydrogen peroxide, air, oxygen, ozone, or by electrochemical oxidation.

5. The process as defined by claim 4, said oxidizing agent comprising an about 10 to 40% stoichiometric excess with respect to said cerous salt.

6. The process as defined by claim 1, wherein said solution of said at least one salt of said trivalent rare earth comprises an aqueous solution of a chloride or nitrate of lanthanum, samarium, europium, gadolinium, dysprosium, thulium, ytterbium, lutecium and yttrium.

7. The process as defined by claim 6, wherein the concentration of the aqueous solution of the at least one salt of said trivalent rare earth ranges from 0.2 to 4 moles per liter.

8. The process as defined by claim 1, wherein said basic solution comprises an aqueous solution of ammonium, sodium or potassium hydroxide, or sodium carbonate.

9. The process as defined by claim 8, the normality of said basic solution ranging from 1 to 5N.

10. The process as defined by claim 8, the reaction medium comprising an at least 5% stoichiometric excess of equivalents of base with respect to the number of equivalents of cerium and rare earth values.

11. The process as defined by claim 8, wherein the pH of the reaction medium ranges from 6 to 10.

12. The process as defined by claim 11, wherein the pH of the reaction medium ranges from 7 to 9.

13. The process as defined by claim 11, wherein the pH of the reaction medium is controlled within ±0.1 pH units.

14. The process as defined by claim 1, wherein the holding time in the step (i) ranges from 30 minutes to 2 hours.

15. The process as defined by claim 14, wherein the temperature of the step (i) reaction medium ranges from 10° to 95° C.

16. The process as defined by claim 15, wherein the temperature of the step (i) reaction medium ranges from 20° to 70° C.

17. The process as defined by claim 15 further comprising aging the reaction mass prior to filtering at a temperature ranging from 10° to 95° C. for from 30 minutes to 2 hours.

18. The process as defined by claim 17, said aging temperature ranging from 20° to 80° C.

19. The process as defined by claim 15, wherein said filtering step (ii) is carried out at ambient temperature.

20. The process as defined by claim 1, wherein the filter cake resulting from said step (ii) is washed with water, following which the water content of such filter cake ranges from 20 to 80% by weight.

21. The process as defined by claim 20, the water content of such filter cake ranging from 30 to 50% by weight.

22. The process as defined by claim 1, said step (i) consisting essentially of (ia) simultaneously and continuously intimately admixing, at a temperature ranging from 40° to 95° C., a solution of a cerium salt, a basic solution selected from the group consisting of ammonium, sodium or potassium hydroxide and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (ib) simultaneously and continuously intimately admixing, at a temperature ranging from 10° to 25° C., a solution of a cerium salt, a basic solution and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (iia) intimately admixing the respective precipitates which result, either prior to or after said filtering step (ii), (iii) drying said precipitate admixture, and (iv) thence calcining said precipitate admixture.

23. The process as defined by claim 22, said step (ia) temperature ranging from 40° to 60° C.

24. The process as defined by claim 22, said step (ib) temperature being about 20° C.

25. The process as defined by claim 22, comprising aging the step (ia) and step (ib) reaction media, or mixture thereof, at a temperature ranging from 10° to 95° C. for from 30 minutes to 2 hours.

26. The process as defined by claim 25, said aging temperature ranging from 20° to 70° C.

27. The process as defined by claim 25, comprising (iia) intimately admixing aqueous suspensions of the respective precipitates, either prior to or after the aging thereof, such that the step (ib) precipitate provides from 10 to 75% by weight of the total amount of rare earth values in the product composition, expressed as the oxides thereof.

28. The process as defined by claim 26, said step (ib) precipitate providing from 25 to 75% by weight of the total amount of rare earth values in the product composition, expressed as the oxides thereof.

29. The process as defined by claim 26, further comprising washing the filter cake with water, the water content of said filter cake, after washing, ranging from about 20 to 80% by weight.

30. The process as defined by claim 20, said water content ranging from about 30 to 50% by weight.

31. The process as defined by claim 25, comprising separately filtering the respective precipitates, with said step (ib) precipitate providing from 10 to 75% by weight of the total amount of rare earth values in the product composition, expressed as the oxides thereof.

32. The process as defined by claim 31, said step (ib) precipitate providing from 25 to 75% by weight of the total amount of rare earth values in the product composition, expressed as the oxides thereof.

33. The process as defined by claim 1, comprising drying the precipitate at a temperature ranging from 100° to 600° C. for from 30 minutes to 2 hours.

34. The process as defined by claim 1, comprising calcining said dried precipitate at a temperature ranging from 600° to 1200° C. for from 30 minutes to 10 hours.

35. The process as defined by claim 34, said temperature of calcination ranging from 950° to 1150° C.

36. The process as defined by claim 1, further comprising grinding and classifying the product composition after the calcination thereof.

37. In the polishing of a glassy substrate by lapping same using an abrasive composition, the improvement which comprises, utilizing as the abrasive composition therefor, a liquid suspension of the composition of matter as defined by claim 27.

38. The polishing as defined by claim 37, the glassy substrate comprising a television screen.

39. The polishing composition as defined by claim 27, wherein the polishing composition is a glass polishing composition which can be recycled as a raw material for the glass.

40. The process as defined by claim 1, wherein the polishing composition of matter formed can be used as a raw material in the formation of glass.

41. A polishing composition capable of being recycled into glass, provided by a process consisting essentially of (i) simultaneously and continuously intimately admixing a solution of a cerium salt, a basic solution selected from the group consisting of ammonia, sodium or potassium hydroxide and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (ii) filtering the precipitate which results, (iii) drying said precipitate, and (iv) thence calcining said precipitate.

42. The polishing composition as defined by claim 41, wherein the solution of the cerium salt comprises an aqueous solution of cerous chloride, cerous nitrate, ceric nitrate, or mixture thereof.

43. The polishing composition as defined by claim 41, wherein the concentration of the solution of the cerium salt ranges from 0.2 to 4 moles per liter.

44. The polishing composition as defined by claim 43, wherein the cerium is introduced into the reaction medium in the cerous state and is thereafter oxidized to the ceric state by continuously adding an oxidizing agent to said reaction medium.

45. The polishing composition as defined by claim 44, said oxidation being carried out by means of an oxidizing agent comprising a solution of sodium, potassium or ammonium perchlorate, chlorate, hypochlorate, persulfate, hydrogen peroxide, air, oxygen, oxzone, or by electrochemical oxidation.

46. The polishing composition as defined by claim 44, said oxidizing agent comprising about an 10 to 40% stoichiometric excess with respect to said cerous salt.

47. The polishing composition as defined by claim 41, wherein said solution of said at least one salt of said trivalent rare earth comprises an aqueous solution of a chloride or nitrate of lanthanum, samarium, europium, gadolinium, dysprosium, thulium, ytterbium, luctecium or yttrium.

48. The polishing composition as defined by claim 47, wherein the concentration of the aqueous solution of the at least one salt of said trivalent rare earth ranges from 0.2 to 4 moles per liter.

49. The polishing composition as defined by claim 41, the normality of said basic solution ranging from 1 to 5N.

50. The polishing composition as defined by claim 41, the reaction medium comprising an at least 5% stiochiometric excess of equivalents of base with respect to the number of equivalents of cerium and rare earth values.

51. The polishing composition as defined by claim 41, wherein the pH of the reaction medium ranges from 6 to 10.

52. The polishing composition as defined by claim 51, wherein the pH of the reaction medium ranges from 7 to 9.

53. The polishing composition as defined by claim 51, wherein the pH of the reaction medium is controlled within ±0.1 pH units.

54. The polishing composition as defined by claim 41, wherein the holding time in the step (i) ranges from 30 minutes to 2 hours.

55. The polishing composition as defined by claim 54, wherein the temperature of the step (i) reaction medium ranges from 10° to 95° C.

56. The polishing composition as defined by claim 55, wherein the temperature of the step (i) reaction medium ranges from 20° to 70° C.

57. The polishing composition as defined by claim 55, further comprising aging the reaction mass prior to filtering at a temperature ranging from 10° to 95° C. for from 30 minutes to 2 hours.

58. The polishing composition as defined by claim 57, said aging temperature ranging from 20° to 80° C.

59. The polishing composition as defined by claim 55, wherein said filtering step (ii) is carried out at ambient temperature.

60. The polishing composition as defined by claim 41, wherein the filter cake resulting from said step (ii) is washed with water, following which the water content of such filter cake ranges from 20 to 80% by weight.

61. The polishing composition as defined by claim 60, the water content of such filter cake ranging from 30 to 50% by weight.

62. The polishing composition as defined by claim 41, wherein said step (i) consisting essentially of (ia) simultaneously and continuously intimately admixing, at a temperature ranging from 40° to 95° C., a solution of a cerium salt, a basic solution selected from the group consisting of ammonium or sodium or potassium hydroxide, and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (ib) simultaneously and continuously intimately admixing, at a temperature ranging from 10° to 25° C., a solution of a cerium salt, a basic solution and a solution of at least one salt of a trivalent lanthanide or yttrium rare earth, the oxide of which is colorless, with the number of equivalents of base being at least equal to the number of equivalents of cerium and rare earth values and the pH of the reaction medium being greater than 6, (iia) intimately admixing the respective precipitates which result, either prior to or after said filtering step (ii), (iii) drying said precipitate admixture, and (iv) thence calcining said precipitate admixture.

63. The polishing composition as defined by claim 62, said step (ia) temperature ranging from 40° to 60° C.

64. The polishing composition as defined by claim 62, said step (ib) temperature being about 20° C.

65. The polishing composition as defined by claim 62, comprising aging the step (ia) and the step (ib) reaction medium, or mixture thereof, at a temperature ranging from 10° to 95° C. for from 30 minutes to 2 hours.

66. The polishing composition as defined by claim 65, said aging temperature ranging from 20° to 70° C.

67. The polishing composition as defined by claim 65, comprising (iia) intimately admixing aqueous suspensions of the respective precipitates, either prior to or after the aging thereof, such that the step (ib) precipitate provides from 10 to 75% by weight of the total amount of rare earth values in the product composition, expressed as the oxides thereof.

68. The polishing composition as defined by claim 67, said step (ib) precipitate providing from 25 to 75% by weight of the total amount of rare earth values in the product composition, expressed as the oxides thereof.

69. The polishing composition as defined by claim 67, further comprising washing the filter cake with water, the water content of said filter cake, after washing, ranging from about 20 to 80% by weight.

70. The polishing composition as defined by claim 69, said water content ranging from about 30 to 50% by weight.

71. The polishing composition as defined by claim 65, comprising separately filtering the respective precipitates, with said step (ib) precipitate providing from 10 to 75% by weight of the total amount of rare earth values in the product composition, expressed as the oxides thereof.

72. The polishing composition as defined by claim 71, said step (ib) precipitate providing from 25 to 75% by weight of the total amount of rare earth values in the product composition, expressed as the oxides thereof.

73. The polishing composition as defined by claim 41, comprising drying the precipitate at a temperature ranging from 100° to 600° C. for from 30 minutes to 2 hours.

74. The polishing composition as defined by claim 41, comprising calcining said dried precipitate at a temperature ranging from 600° to 1200° C. for from 30 minutes to 10 hours.

75. The polishing composition as defined by claim 74, said temperature of calcination ranging from 950° to 1150° C.

76. The polishing composition as defined by claim 71, further comprising grinding and classifying the product composition after the calcination thereof.

77. The polishing composition as defined by claim 41, wherein said at least one colorless oxide comprises lanthanum sesquioxide.

78. The polishing composition as defined by claim 41, having a BET specific surface ranging from 2 to 10 $m^2/g$.

79. The polishing composition as defined by claim 78, having particles sizes ranging from 0.2 to 5.0 m.

80. The polishing composition as defined by claim 79, having a mean particle diameter ranging from 0.5 to 1.5 m.

81. The polishing composition as defined by claim 79, comprising from 40 to 99.5% by weight of said ceric oxide and from 0.5 to 60% by weight of said at least one colorless oxide.

82. The polishing composition as defined by claim 81, comprising from 85 to 98% by weight of said ceric oxide and from 2 to 15% by weight of said at least one colorless oxide.

83. A polishing composition comprising a homogeneous suspension, in water, of the composition of matter as defined by claim 41.

84. A polishing composition comprising a homogeneous suspension, in water, of the composition of matter as defined by claim 81.

85. The polishing composition as defined by claim 84, having a concentration, in soft water and expressed as $CeO_2$, ranging from 30 to 200 g/liter.

86. The polishing composition as defined by claim 85, said soft water having hardness of less than 30°TH.

* * * * *